United States Patent Office 3,629,411
Patented Dec. 21, 1971

3,629,411
FUNGICIDAL COMPOSITIONS AND METHODS OF COMBATING FUNGI USING O-ALKYL-S,S-DI-ALKYL DITHIOPHOSPHATES
Gerhard Schrader, Wuppertal-Cronenberg, Karl Mannes, Cologne-Stammheim, and Hans Scheinpflug, Leverkusen, Germany, assignors to Farbenfabriken Bayer Aktiengesellschaft, Leverkusen, Germany
No Drawing. Original application Aug. 5, 1966, Ser. No. 570,436, now Patent No. 3,499,951, dated Mar. 10, 1970. Divided and this application July 16, 1969, Ser. No. 868,254
Claims priority, application Germany, Aug. 26, 1965, F 46,992
Int. Cl. A01n 9/36
U.S. Cl. 424—217        5 Claims

ABSTRACT OF THE DISCLOSURE

Fungicidal compositions of, and methods of combating fungi using O-(alkyl, alkenyl, alkynyl, and haloalkyl)-S,S-di(phenyl and mono and di-halo, nitro, alkyl and alkoxy substituted-phenyl)-dithiolphosphoric acid triesters.

---

This is a divisional application of copending parent application U.S. Ser. No. 570,436, filed Aug. 5, 1966, now U.S. Pat. 3,499,951 issued Mar. 10, 1970.

The present invention relates to particular new S,S-diphenyl-dithiolphosphoric acid triesters having fungicidal properties, to compositions thereof with dispersible carrier vehicles, and to the preparation and use thereof.

French Pat. No. 1,378,035 discloses (thiono) dithiolphosphoric acid diester monoamides of the general formula:

$$\begin{array}{c} R_a \\ \diagdown \\ R_b \end{array} N - \overset{X}{\underset{\displaystyle \|}{P}} \begin{array}{c} SR_c \\ \diagup \\ SR_d \end{array}$$

in which $R_a$ and $R_b$ may signify hydrogen atoms or alkyl or aryl radicals and $R_c$ or $R_d$ stand for (inter alia) aryl radicals, while X is an oxygen or sulfur atom. According to the information given in the aforesaid French patent, these compounds are suitable for the control of plant pests and plant diseases.

It is an object of the present invention to provide particular new S,S-diphenyl-dithiolphosphoric acid triesters which possess valuable fungicidal properties, to provide active compositions in the form of mixtures of such compounds with solid and liquid dispersible carrier vehicles, to provide a process for producing such compounds, and to provide methods of using such compounds in a new way, especially for combating fungi.

Other and further objects of the present invention will become apparent from a study of the within specification and accompanying examples.

It has now been found in accordance with the present invention that the particular new S,S-diphenyldithiolphosphoric acid triesters having the general formula:

$$RO-\overset{O}{\underset{\displaystyle \|}{P}}\left[ S-\!\!\!\underset{\displaystyle }{\underset{\displaystyle }{\bigcirc}}\!\!\!\!(R')_n \right]_2 \quad (I)$$

in which R represents a member selected from the group consisting of alkyl, alkenyl, alkynyl, and haloalkyl, R' represents a member selected from the group consisting of halo, nitro, lower alkyl, and lower alkoxy, and n is a whole number from 0 to 2, have markedly strong fungicidal properties.

It has been further found in accordance with the present invention that S,S-diphenyldithiolphosphoric acid triesters of the general Formula I are readily obtained in good yields and with considerable purity by the process which comprises reacting phosphoric acid monoester dihalides having the general formula:

$$RO-\overset{O}{\underset{\displaystyle \|}{P}}\begin{array}{c}Hal\\ \diagdown \\ Hal\end{array} \quad (IIa)$$

in which R is the same as defined above and Hal is a halogen atom such as chloro, bromo, fluoro or iodo, especially chloro, with thiophenols having the general formula:

$$HS-\!\!\!\underset{\displaystyle }{\underset{\displaystyle }{\bigcirc}}\!\!\!\!(R')_n \quad (IIb)$$

in which R' and n are the same as defined above in the form of their salts or in the presence of acid binding agents.

The particular new S,S-diphenyldithiolphosphoric acid triesters of general Formula I above are distinguished by outstanding fungitoxic properties and, surprisingly, they are in this respect distinctly superior to the compounds of analogous constitution and the same type of activity which are known from the aforesaid French patent.

The course of the reaction according to the instant invention is illustrated by the following equation:

$$RO-\overset{O}{\underset{\displaystyle \|}{P}}\begin{array}{c}Hal\\ \diagdown \\ Hal\end{array} + 2HS-\!\!\!\underset{\displaystyle }{\underset{\displaystyle }{\bigcirc}}\!\!\!\!(R')_n \longrightarrow$$

$$(IIa') \qquad (IIb')$$

$$RO-\overset{O}{\underset{\displaystyle \|}{P}}\left[ S-\!\!\!\underset{\displaystyle }{\underset{\displaystyle }{\bigcirc}}\!\!\!\!(R')_n \right]_2 + 2HHal$$

$$(I')$$

wherein R, R', Hal and n are the same as defined above.

As examples of the starting phosphoric acid monoester dihalides of general Formula IIa, there may be mentioned: O-ethyl-, O-n-propyl-, O-isopropyl-, O-n-butyl-, O-allyl-, O-crotonyl-, O-propargyl-, O-2-chloroethyl- and O-2,2,2-trichloroethyl-phosphoric acid monoester dichlorides. As examples of the starting thiophenols of general Formula IIb, there may be mentioned: thiophenol, 2-, 3- and 4-chloro-thiophenol, 4-isopropyl-thiophenol, 4-methoxy-thiophenol, 4-nitro-thiophenol, 2-, 3- and 4-thiocresol, and 2-bromothio-para-cresol.

The phosphoric acid monoester dihalides usable as starting materials according to the present invention have already been described in the literature. They may be prepared according to known methods from the phosphorus oxyhalides by reaction with the corresponding alcohols, frequently without the concurrent use of acid acceptors. The crude products obtainable in this manner can in most cases be immediately further reacted for the purposes of the present invention without prior purification by distillation.

The process of the present invention is preferably carried out in the presence of solvents or diluents. As such, practically all inert organic solvents are suitable. However, particularly good results have been obtained with aliphatic and aromatic hydrocarbons (optionally chlorinated), for example methylene chloride, di-, tri- and tetrachloroethylene, chloroform, carbon tetrachloride, benzine, benzene, chlorobenzene, toluene and xylene; ethers, for example diethyl and di-n-butyl ether, dioxan, tetrahydrofuran; aliphatic ketones and nitriles of low molecular weight, for example acetone, methylethyl ketone, methylisopropyl ketone, methylisobutyl ketone, acetonitrile and proprionitrile; and low boiling aliphatic alcohols, for example methanol, ethanol and isopropanol; and the like.

As mentioned above, the reaction in accordance with the instant invention may be carried out in the presence of acid binding agents. The usual acid acceptors such as alkali metals (e.g. sodium, potassium, etc.) hydroxides, carbonates and alcoholates, and also tertiary organic bases, for example triethylamine, dimethyl aniline and pyridine, may be used as acid binding agents. Instead of working in the presence of acid binding agents, the salts, preferably alkali (e.g. sodium, potassium, etc.) or ammonium salts, of the thiophenols concerned may first be prepared and then reacted with the phosphoric acid monoester dihalides.

The production process of the present invention can be carried out successfully within a wide range of temperatures. It is generally perofrmed between −20° C. and the boiling point of the mixture, preferably about 0° and 100° C.

The reaction is preferably carried out under normal or atmospheric pressure, but it is also possible to work at increased or reduced pressure.

When carrying out the process in accordance with the invention, two mols of the thiophenol are generally used for each mol of the phosphoric acid monoester dihalide concerned; the thiophenol may, however, also be used in excess.

Moreover, the phosphoric acid monoester dihalide is expediently added dropwise, at the above mentioned temperature and with stirring, to the solution or suspension of the thiophenol (or of the corresponding phenolate). External cooling of the mixture is often necessary, because of the reaction generally proceeds with a more or less strong evolution of heat. Finally, it has proved expedient, after mixing the starting components, to stir the reaction mixture for an appreciable period (e.g. 1 to 5 hours or overnight), optionally with moderate heating, in order to complete the reaction. In this case the products of the reaction are obtained in particularly good yields as well as with outstanding purity.

The working up of the reaction mixture may be effected according to methods which are known in principle by pouring the mixture into water, washing and drying the organic phase, distilling off the solvent and (as far as possible) fractional distillation of the residue under reduced pressure.

The particular new dithiolphosphoric acid triesters obtainable by the instant process are obtained either in the form of crystalline compounds with a sharp melting point which can easily be further purified by recrystallization from the customary solvent, or in the form of colorless to yellow oils some of which can be distilled under greatly reduced pressure without decomposition. If this is not possible, the compounds obtainable according to the invention may, for the purpose of purification, be "partially distilled," i.e. freed from the last volatile impurities by heating to slightly to moderately elevated temperatures for an appreciable period and under reduced pressure.

By means of the present process, inter alia, the following compounds can be obtained: O-ethyl-, O-n-propyl- and O-n-butyl-S, S-diphenyl-; O-ethyl-, O-n-propyl- and O-n-butyl - S,S - di(2- or 4-methylphenyl); O-ethyl- and O-isopropyl-S,S-di(4-chlorophenyl)-; O-ethyl - S,S - di(4-methoxyphenyl)-, O-allyl-S,S-diphenyl-, O-ethyl-S,S-di(2, 4-dichlorophenyl)-, O-ethyl-S,S-di(4-nitrophenyl)-, O-isopropyl - S,S - diphenyl- and O-isopropyl-S,S-di-(2-methylphenyl)-dithiophosphoric acid esters.

As already mentioned, the particular new dithiolphosphoric acid triesters of the present invention are strongly fungitoxic to a number of fungoid pathogenic agents. By reason of this fact, as well as in view of their low toxicity towards warm-blooded animals, they are particularly suitable for the control of undesirable plant growth, their good compatibility with higher plants particularly favoring their use against fungus diseases. The particular new compounds of the invention can be used as fungitoxic agents in plant protcetion against fungi of the most widely varied classes, e.g. Archimycetes, Phycomycetes, Ascomycetes, Basidiomycetes and *Fungi imperfecti*.

However, the compounds of the invention have yielded particularly good results in the control of disease of rice, since they possess an excellent protective and curative action, for instance, against *Piricularia oryzae* in rice.

Thus, the new compounds of the instant invention can be used as fungicides, either alone or in admixture with solid or liquid carriers or diluents.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pp. 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes) paraffins (for instance, petroleum fractions), chlorinated aliphatic hydrouarbons (for instance, methylene chloride, etc.), alcohols (for instance, methanol, ethanol, propanol, butanol, etc.), amines (for instance, ethanolamine, etc.), amides (for instance, dimethyl formamide, etc.), sulfoxides (for instance, dimethyl sulfoxide, etc.), ketones for instance, acetone, etc.), and water; as well as dispersible finely divided solid carriers, such as ground natural minerals (for instance, kaolins, alumina, silica, chalk, i.e., calcium carbonate, talic, kieselguhr, etc.) and ground synthetic minerals (for instance, highly dispersed silicic acid, silicates, e.g., alkali silicates, etc.); whereas the following may be chiefly considered for use as carrier vehicle assistants, e.g., surface-active agents, for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.001 and 0.2% by weight, and preferably 0.0001 and 20% by weight, of the mixture. Thus, the present invention contemplates over-all compositions which comprise mixtures of a dispersible carrier vehicle, such as (1) a dispersible carrier solid, or (2) a dispersible carrier liquid preferably including a carrier vehicle assistant, e.g., surface-active agent, such as an emulsifying agent and/or a dispersing agent, and an amount of the active compound which is effective for the purpose in question and which is generally between about 0.0001 and 95% by weight, and preferably 0.001 and 20% by weight of the mixture.

Furthermore, the present invention contemplates methods of selectively controlling and combating fungi, which comprise applying to at least one of (a) such fungi and (b) their habitat, a fungicidally effective amount of the particular compound of the invention alone or together with a carrier vehicle as noted above. The instant formulations or compositions are applied in the usual manner, for example, by spraying, atomizing, vaporizing, scattering, dusting, watering, sprinkling, pouring, and the like.

In particular, the concentration of the active compound of the invention which is utilized with the carrier vehicle will depend upon the intended application, as the artisan will appreciate. In special cases, however, it is possible to go above or to go below such range of concentration, e.g., as aforesaid utilizing a broad range of 0.0001 and 95% by weight of the mixture.

The outstanding fungitoxic action of the S,S-diphenyl-dithiolphosphoric acid triesters of the present invention, as well as their distinct superiority compared with prior art products of analogous structure, can be seen from the following experimental results set forth by way of illustration and not limitation:

EXAMPLE 1

Piricularia test: liquid preparation of active substance

Solvent: 1 part by weight acetone
Dispersing agent: 0.05 part by weight sodium oleate
Other additive: 0.2 part by weight gelatin
Water: 98.75 parts by weight $H_2O$.

The amount of the particular active compound required for the desired final concentration of such active compound in the spray liquor is mixed with the stated amount of solvent and the concentrate obtained diluted with the stated amount of water containing the stated dispersing agent and other additive.

Thirty rice plants, which are about 14 days old, are sprayed with the above prepared spray liquor until dripping wet. The plants remain in a greenhouse at a temperature of 22 to 24° C. and at a relative atmospheric humidity of about 70%, until dry. They are then inoculated with an aqueous suspension of 100,000 to 200,000 spores/ml. of *Piricularia oryzae* and placed in a chamber at 24–26° C. and at a relative atmospheric humidity of 100%.

Five days after inoculation, the degree of infestation of all the leaves of the treated plants which were present at the time of inoculation is determined as a percentage of the untreated but also inoculated control plants. 0% means that no infestation occurred and 100% that the infestation is exactly the same as that of the control plants.

Test for curative action

In the test just described using a liquid preparation of the active compound, besides the protective action, the curative action of the particular active compounds may also be determined. The test for curative action varies in certain points from the test procedure described above which only gives an indication of the protective effect. Specifically, in determining the curative effect, the particular active compounds are applied, not before inoculation, but 16 hours after inoculation. Substances which exhibit an action when the test is carried out in the latter manner are capable of destroying the fungus after the infection and thereby exercise a curative action.

The active compounds, their concentrations and the results obtained can be seen from the following Table 1:

TABLE 1.—PIRICULARIA TEST
[Liquid preparation of the active compound]

| Active compound (constitution) | | Infestation expressed as percentage of the infestation of the untreated control with an active compound concentration of (percent)— | | | | |
|---|---|---|---|---|---|---|
| | | 0.05 | 0.025 | 0.01 | 0.005 | 0.001 |
| (III) 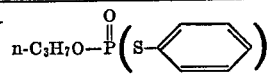 | pr...... | 0 | 0 | 0 | 0 | 75 |
| | cur...... | 0 | 0 | 11 | | |
| (IV) 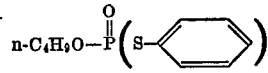 | pr...... | 0 | 0 | 5 | 14 | |
| | cur...... | 0 | 0 | | | |
| (V) 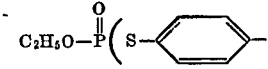 | pr...... | 0 | 2 | 83 | | |
| (VI) 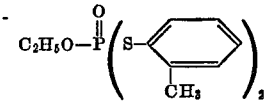 | pr...... | 0 | 0 | 0 | 75 | |
| | cur...... | 0 | 0 | | | |
| (VII) 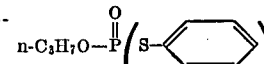 | pr...... | 0 | 0 | 15 | | |
| | cur...... | 25 | | | | |
| (VIII) 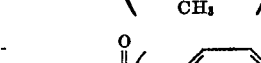 | pr...... | 0 | 0 | 75 | | |
| (IX)  | pr...... | 0 | 0 | 0 | 13 | 58 |
| | cur...... | 0 | 3 | | | |

TABLE 1—Continued

| Active compound (constitution) | | Infestation expressed as percentage of the infestation of the untreated control with an active compound concentration of (percent)— | | | | |
|---|---|---|---|---|---|---|
| | | 0.05 | 0.025 | 0.01 | 0.005 | 0.001 |
| (X) 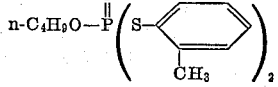 | pr | 0 | 0 | 75 | | |
| (XI) 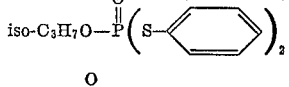 | pr | 0 | 0 | 0 | 0 | |
| | cur | 0 | 25 | | | |
| (XII) 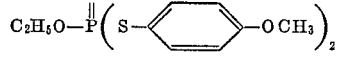 | pr | 0 | 0 | 28 | 75 | |
| (Aa) 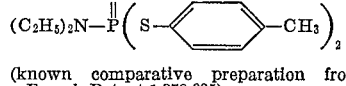 (known comparative preparation from French Patent 1,378,035) | pr | 0 | 50 | | | |
| | cur | 96 | | | | |

NOTE.—pr.=protective action; cur.=curative action.

The following examples are further set forth by way of illustration, and not limitation, of the production process of the present invention.

EXAMPLE 2

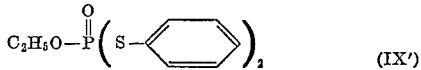

110 grams (1 mol) of thiophenol are dissolved in 800 cc. of benzene. To the resulting solution is added, with stirring, a sodium methylate solution which contains 1 mol of sodium in solution. 82 grams (0.5 mol) of O-ethylphosphoric acid ester dichloride are then added dropwise to the reaction mixture at 5 to 10° C. with further stirring. The reaction mixture is kept at the stated temperature for a further three hours, poured into 400 cc. of ice water and then washed twice with 300 cc. of water in each case. The benzene solution is then dried over anhydrous sodium sulfate. During the ensuring fractional distillation, after evaporation of the solvent, 108 grams (70% of the theoretical amount) of O-ethyl-S,S-diphenyl-dithiol-phosphoric acid ester with a boiling point of 154° C./0.01 mm. Hg are obtained.

EXAMPLE 3

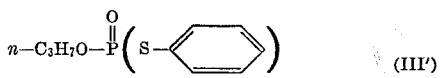

(a) A solution of 44 grams (0.4 mol) of thiophenol in 100 cc. of benzene is neutralized with a sodium methylate solution containing 0.4 mol of sodium. After distilling off the solvent, the sodium thiophenolate which remains is suspended in 200 cc. of benzene and to this suspension there are added dropwise, at 0 to 5° C., 35.4 grams (0.2 mol) of O-n-propylphosphoric acid ester dichloride. The reaction mixture is then stirred for a further 3 hours at 50° C., washed with water after cooling to room temperature, and dried over anhydrous sodium sulfate. The solvent is evaporated under reduced pressure and, as residue, 28 grams (43.3% of the theoretical amount) of O-n-propyl-S,S-diphenyl-dithiophosphoric acid ester are obtained.

Analysis.—Calculated (percent): P, 9.58; S, 19.76. Found (percent): P, 9.35; S, 19.70.

(b) 220 grams (2.0 mol) of thiophenol are converted into the corresponding sodium thiophenolate in the manner decribed in Example 3a. The dry salt is suspended in 500 cc. of acetonitrile, and to this suspension 177 grams (1.0 mol) of O-n-propylphosphoric acid ester dichloride are added dropwise at 0 to 10° C. The reaction proceeds with evolution of heat. The reaction mixture is further stirred for some time at room temperature and then poured into water. The oil which is separated is dissolved in benzene and the benzene solution is washed with water and dried over anhydrous sodium sulfate. The solvent is then distilled off under reduced pressure. The last volatile portions are removed at bath temperature of 100° C. and 1.5 mm. Hg, and the resulting O-n-propyl-S,S-diphenyl-dithiolphosphoric acid ester is obtained in the form of a yelow oil. The yield is 221 grams (68% of the theoretical amount).

Analysis.—Calculated (percent): P, 9.58; S, 19.76. Found (percent) P, 9.70; S, 19.90.

EXAMPLE 4

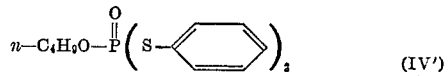

110 grams (1.0 mol) of thiophenol are converted in the usual manner into the sodium salt, as noted in Example 3. The dry thiophenolate is suspended in 500 cc. of acetonitrile and the suspension is reacted with 95.5 grams of O-n-butylphosphoric acid ester dichloride in the manner described in Example 3b. The reaction mixture is then stirred overnight at room temperature. The separated oil is dissolved in benzene after the mixture has been poured into water, and the benzene solution is washed with water until there is a neutral reaction and then it is dried. After evaporation of the solvent and removal of all volatile portions at a bath temperature of 150° C. and a pressure of 1 mm. Hg, 120.5 grams (71.3% of the theoretical amount) of O-n-butyl-S,S-diphenyl-dithiophosphoric acid ester are obtained as a pale yellow oil with a refractive index $n_D^{26}$ of 1.5965.

*Analysis.*—Calculated (percent): P, 9.18; S, 18.94. Found (percent): P, 9.30; S, 19.30.

The following compounds can be prepared by methods analogous to the method described above using corresponding molar amounts of the appropriate starting materials:

reaction mixture is stirred for a further 2 hours at the temperature stated and then poured into 300 cc. of ice water. The benzene solution is washed once more with water and dried over anhydrous sodium sulfate. After the solvent has been distilled off, an oily, crude product is obtained as residue which solidifies very rapidly in crystalline form. 105 grams (55% of the theoretical amount) of O - ethyl - S,S - bis(4 - chloro - phenyl)-dithiolphosphoric acid ester with a melting point of 71° C. are isolated.

| Constitution | | Yield (percent of the theory) | Physical properties (Refractive index or melting point) | |
|---|---|---|---|---|
| (V′) | 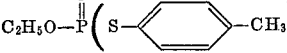 | 67 | $n_D^{26}$ | 1.6067 |
| (VI′) | 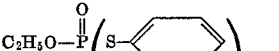 | 58 | $n_D^{26}$ | 1.6078 |
| (VII′) | 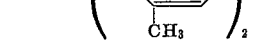 | 67 | $n_D^{26}$ | 1.5993 |
| (X′) | 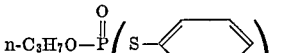 | 71 | $n_D^{26}$ | 1.5860 |
| (XII′) |  | 68.2 | $n_D^{26}$ | 1.6152 |
| (XIII) | 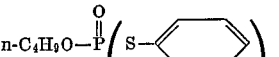 | 73.0 | $n_D^{26}$ | 1.6088 |
| (XIV) |  | 79.6 | $n_D^{26}$ | 1.5946 |
| (XI′) | 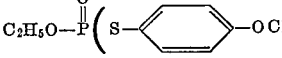 | 69.2 | $n_D^{26}$ | 1.6178 |
| (XV) | 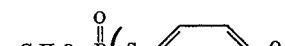 | 71.9 | $n_D^{26}$ | 1.6281 |
| (XVI) |  | 42.9 | $n_D^{26}$ | 1.6160 |
| (XVII) | 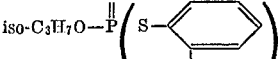 | 56.2 | Melting point: 90 to 92° C. | |

EXAMPLE 5

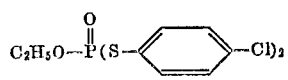  (XVIII)

145 grams (1 mol) of 4-chlorothiophenol are dissolved in 400 cc. of benzene. To this solution is added, with stirring, a sodium ethylate solution which contains 1 mol of sodium. Then, with further stirring, 82 grams (0.5 mol) of O-ethylphosphoric acid ester dichloride are added dropwise to the reaction mixture at 10 to 15° C. The

EXAMPLE 6

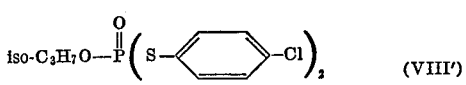  (VIII′)

To a solution of 145 grams (1 mol) of 4-chlorothiophenol in 600 cc. of benzene is added 1 mol of sodium methylate. 89 grams of O-iso-propylphosphoric acid ester dichloride are then added dropwise at 15 to 20° C., with stirring, after which the reaction mixture is stirred for a further 2 hours at the temperature stated and then poured into 400 cc. of ice water. After the benzene solution has been washed several times with water it is dried over anhydrous sodium sulfate and, finally, the solvent is distilled off. 123 grams (63% of the theoretical amount) of O - iso - propyl - S,S - bis(4 - chlorophenyl) dithiolphosphoric acid ester with a melting point of 52° C. are obtained.

EXAMPLE 7

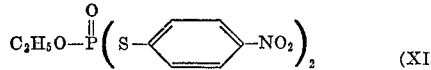 (XIX)

180 grams (1 mol) of 4-nitrothiophenol sodium are dissolved in 400 cc. of acetonitrile. To this solution are added 82 grams (0.5 mol) of O-ethylphosphoric acid ester dichloride at 20° C., with stirring, and the reaction mixture is then stirred for a further 2 hours at room temperature, after which it is worked up in the manner which has already been described in Example 2. 155 grams (77% of the theoretical amount) of O-ethyl-S,S-bis(4 - nitrophenyl)dithiol - phosphoric acid ester with a melting point of 106° C. are obtained.

EXAMPLE 8

 (IX″)

To a solution of 55 grams (0.5 mol) of thiophenol in 400 cc. of ethanol which contains 0.5 mol of sodium are added dropwise 40.75 grams (0.25 mol) of O-ethylphosphoric acid ester dichloride at 0 to 10° C., and the mixture is then stirred overnight at room temperature. The reaction mixture is then poured into water, the separated oil is dissolved in benzene, the benzene solution is washed with water until there is a neutral reaction, and the organic phase is then dried over anhydrous sodium sulfate. After evaporation of the solvent there remain 51.5 grams (60.9% of the theoretical amount) of O - ethyl - S,S-diphenyl-dithiolphosphoric acid ester which is identical to the compound of the same constitution which is obtainable according to Example 2.

EXAMPLE 9

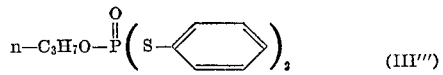 (III‴)

55 grams (0.5 mol) of thiophenol are dissolved together with 56 grams (0.55 mol) of anhydrous triethylamine in 400 cc. of benzene. 44 grams (0.25 mol) of O-n-propylphosphoric acid ester dichloride are added dropwise to this solution at 0 to 10° C. The ensuing reaction proceeds exothermically. After the mixture has been stirred for a short time at room temperature, the precipitated triethylammonium hydrochloride is filtered off, the filtrate is washed with water, and the organic phase is dried and concentrated by evaportion. There remain as residue 56 grams (65.9% of the theoretical amount) of O - n - propyl - S,S - diphenyldithiolphosphoric acid ester. The compound is identical to that obtainable according to Example 3.

EXAMPLE 10

In the same way, in accordance with the procedure of Example 2, using corresponding molar amounts of the following starting materials:

(a) O-crotonylphosphoric acid ester dichloride (i.e. O-γ-allylphosphoric acid ester dichloride) and 3-bromo-5-fluorothiophenol-sodium;

(b) O-propargylphosphoric acid ester dichloride (i.e. O-prop-2-yn-1-ylphosphoric acid ester dichloride) and 2-tert.-butoxy-thiophenol-sodium;

(c) O-fluoromethyl-phosphoric acid ester dichloride and 4-isopropyl-thiophenol-sodium; and (d) O-(4-bromo-n-butyl)-phosphoric acid ester dichloride and 2,4-dichloro-thiophenol-sodium;

the respective final products are obtained:

(a′) O - crotonyl - S,S - bis(3 - bromo - 5 - fluorophenyl)-dithiolphosphoric acid ester;

(b′) O - propargyl - S,S - bis(2 - tert. - butoxy - phenyl)-dithiolphosphoric acid ester;

(c′) O - fluoromethyl - S,S - bis(4 - isopropylphenyl)-dithiolphosphoric acid ester; and (d′) O - (4 - bromo - n- butyl) - S,S - bis(2′,4′ - dichlorophenyl)-dithiolphosphoric acid ester.

Advantageously, in accordance with the present invention, in the foregoing formulae:

R represents straight or branched chain alkyl such as methyl, ethyl, n-propyl, isopropyl, n-butyl, isobutyl, sec.-butyl, tert.butyl, pentyl, i.e. n-amyl, isoamyl, hexyl, and the like, and especially alkyl having 1–6 carbon atoms; or alkenyl such as vinyl, α, β- and γ-allyl (i.e. crotonyl), 1-, 2- and 3-butenyl, and the like, and especially alkenyl having 2–4 carbon atoms, and most especially crotonyl; or alkynyl such as ethynyl, 1- and 2-propynyl, 1-, 2- and 3-butynyl, and the like, and especially alkynyl having 2–4 carbon atoms, and most especially propargyl; or haloalkyl such as mono-, di-, tri- and poly-, -chloro-, -bromo-, -fluoro- and -iodo- as well as mixed di-, tri- and poly-, -chloro-, -bromo-, -fluoro- and -iodo-, -substituted methyl, ethyl, n-propyl, isopropyl, n-butyl, isobutyl, sec.-butyl, tert.-butyl, amyl, hexyl, and the like, especially haloalkyl having 1–6 carbon atoms, and most especially mono-, di- and tri-chloro substituted methyl to hexyl inclusive, including 2-chloroethyl, 2,2,2-trichloroethyl, and the like;

R′ represents halogen such as chloro, bromo, fluoro and iodo, especially chloro, bromo and fluoro, and most especially chloro; or nitro; or lower alkyl such as methyl, ethyl, n-propyl, isopropyl, n-btuyl, isobutyl, sec.-butyl, tert.-butyl, and the like, especially alkyl having 1-4 carbon atoms, and most especially methyl; or lower alkoxy such as methoxy, ethoxy, n-propoxy, isopropoxy, n-butoxy, isobutoxy, sec.-butoxy, tert.-butoxy, and the like, especially alkoxy having 1-4 carbon atoms, and most especially methoxy; and n is a whole number from 0 to 2, especially 0–1.

All of the foregoing compounds in accordance with the present invention possess the desired strong fungicidal properties, with regard to a broad spectrum of activity, enabling such compounds with a concomitantly low toxicity toward warm-blooded creatures and corresponding favorable compatibility with higher plants to be used more effectively to control and/or eliminate fungi by application of such compounds to the fungi and/or their habitat.

It will be appreciated that the instant specification and examples are set forth by way of illustration and not limitation, and that various modifications and changes may be made without departing from the spirit and scope of the present invention.

What is claimed is:

1. Fungicidal composition which comprises a mixture of a dispersible carrier vehicle and a fungicidally effective amount, substantially between about 0.0001 and 95% by weight of the mixture, of a S,S-diphenyl-dithiolphosphoric acid triester having the formula:

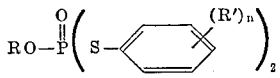

in which R is selected from the group consisting of alkyl and haloalkyl both having 1–6 carbons R′ is selected from the group consisting of chloro, nitro, alkyl having 14 carbons and alkoxy having 1–4 carbons and n is 0 or 1.

2. Method of combating fungi which comprises applying to at least one of (a) such fungi and (b) their habitat, a fungicidally effective amount of a S,S-diphenyl-dithiolphosphoric acid triester having the formula:

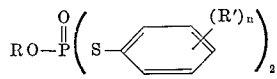

in which R is selected from the group consisting of alkyl, and haloalkyl both having 1–6 carbons, R' is selected from the group consisting of chloro, nitro, alkyl having 1–4 carbons and alkoxy having 1–4 carbons, and $n$ is 0 or 1.

3. Method according to claim 2 wherein said triester is used in the form of a mixture with a dispersible carrier vehicle selected from the group consisting of (1) a dispersible finely divided carrier solid and (2) a dispersible carrier liquid containing a surface-active agent, such triester being present in a fungicidally effective amount, substantially between about 0.0001 and 20% by weight of the mixture.

4. Method according to claim 2 wherein said triester is selected from the group consisting of:
O-n-propyl-S,S-diphenyl-dithiolphosphoric acid ester;
O-n-butyl-S,S-diphenyl-dithiolphosphoric acid ester;
O-ethyl-S,S-bis(4-methylphenyl)-dithiolphosphoric acid ester;
O - isopropyl-S,S-bis(4-chlorophenyl)-dithiolphosphoric acid ester;
O - ethyl - S,S-bis(4-methoxyphenyl)-dithiolphosphoric acid ester;
O - (2-chloroethyl)-S,S-diphenyl-dithiolphosphoric acid ester;
O - (2,2,2-trichloroethyl)-S,S-bis(2'-methylphenyl)-dithiolphosphoric acid ester;
O - ethyl-S,S-bis(4-nitrophenyl)-dithiolphosphoric acid ester;
O-ethyl-S,S-diphenyl-dithiolphosphoric acid ester.

5. Method according to claim 2 wherein said triester is O-n-propyl-S,S-diphenyl-dithiolphosphoric acid ester.

References Cited
UNITED STATES PATENTS 3,081,329  3/1963  Vegter _____ 260—461
3,261,804  7/1966  Graham _____ 260—45.7

SAM ROSEN, Primary Examiner

A. J. ROBINSON, Assistant Examiner

U.S. Cl. X.R.

424—218, 225